United States Patent [19]

Norris

[11] Patent Number: 4,492,445
[45] Date of Patent: Jan. 8, 1985

[54] PHOTOGRAPHIC FILM ASSEMBLAGE WITH MEANS FOR ESTABLISHING A GAP BETWEEN A PAIR OF PRESSURE-APPLYING ASSEMBLIES

[75] Inventor: Philip R. Norris, North Reading, Mass.

[73] Assignee: Polaroid Corporation, Cambridge, Mass.

[21] Appl. No.: 439,733

[22] Filed: Nov. 8, 1982

[51] Int. Cl.³ .................. G03B 17/26; G03B 17/52
[52] U.S. Cl. .................................. 354/180; 354/304
[58] Field of Search .......................... 354/178–182, 354/86, 304

[56] References Cited

U.S. PATENT DOCUMENTS

| | | | |
|---|---|---|---|
| 3,120,794 | 2/1964 | Gold | 95/89 |
| 3,604,329 | 9/1971 | Land | 95/13 |
| 3,732,099 | 5/1973 | Chen | 96/29 R |
| 3,882,518 | 5/1975 | Douglas | 354/301 |
| 4,104,669 | 8/1978 | Friedman | 354/304 |
| 4,192,593 | 3/1980 | Norris | 354/86 |
| 4,236,798 | 12/1980 | Sylvester | 354/181 |
| 4,318,601 | 3/1982 | Martin | 354/180 X |
| 4,360,260 | 11/1982 | Eloranta et al. | 354/86 X |

OTHER PUBLICATIONS

"Research Disclosure," No. 13320, May, 1975.

Primary Examiner—John Gonzales
Attorney, Agent, or Firm—Alfred E. Corrigan

[57] ABSTRACT

A film assemblage for use with a camera of the self-developing type having a pair of pressure-applying assemblies, e.g., a pair of juxtaposed roller assemblies, for rupturing a container of processing liquid attached to a leading end of an exposed film unit and spreading its contents in a layer between elements of the film unit as it is being advanced between and in engagement with adjacent liquid spreading surfaces of the assemblies so as to initiate the formation of a visible image in the film unit. The film assemblage includes means for pregapping the adjacent liquid spreading surfaces to a degree which will in turn provide a processing liquid layer of an optimum thickness for the film units in that particular film assemblage.

15 Claims, 13 Drawing Figures

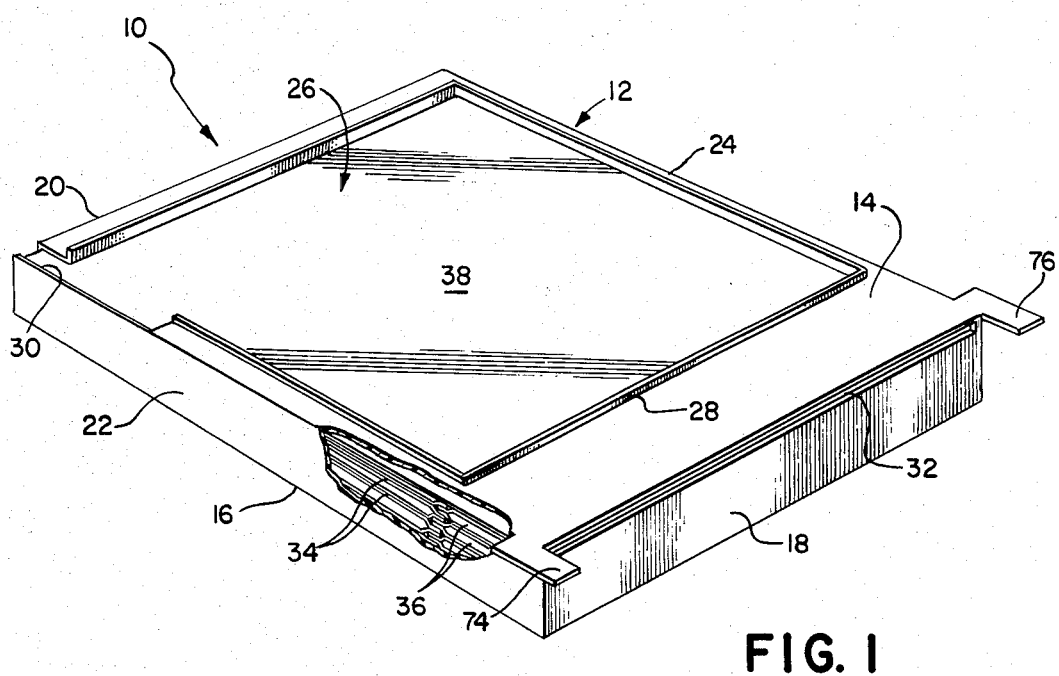
FIG. 1
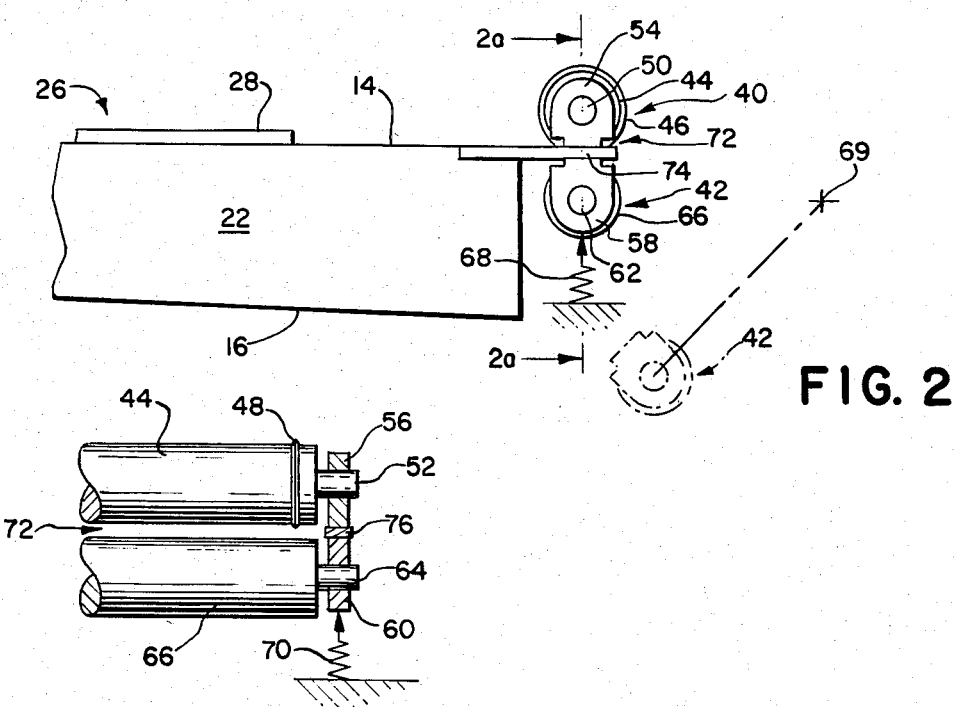
FIG. 2
FIG. 2a

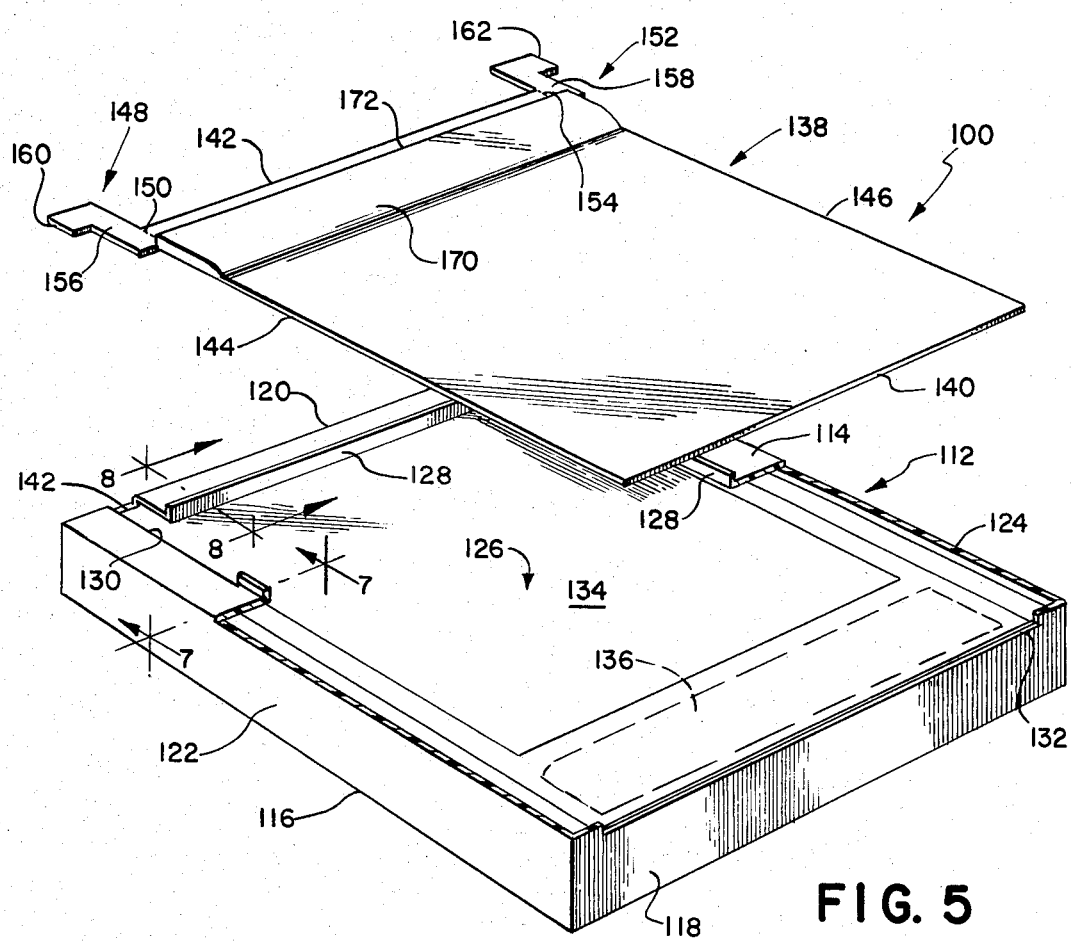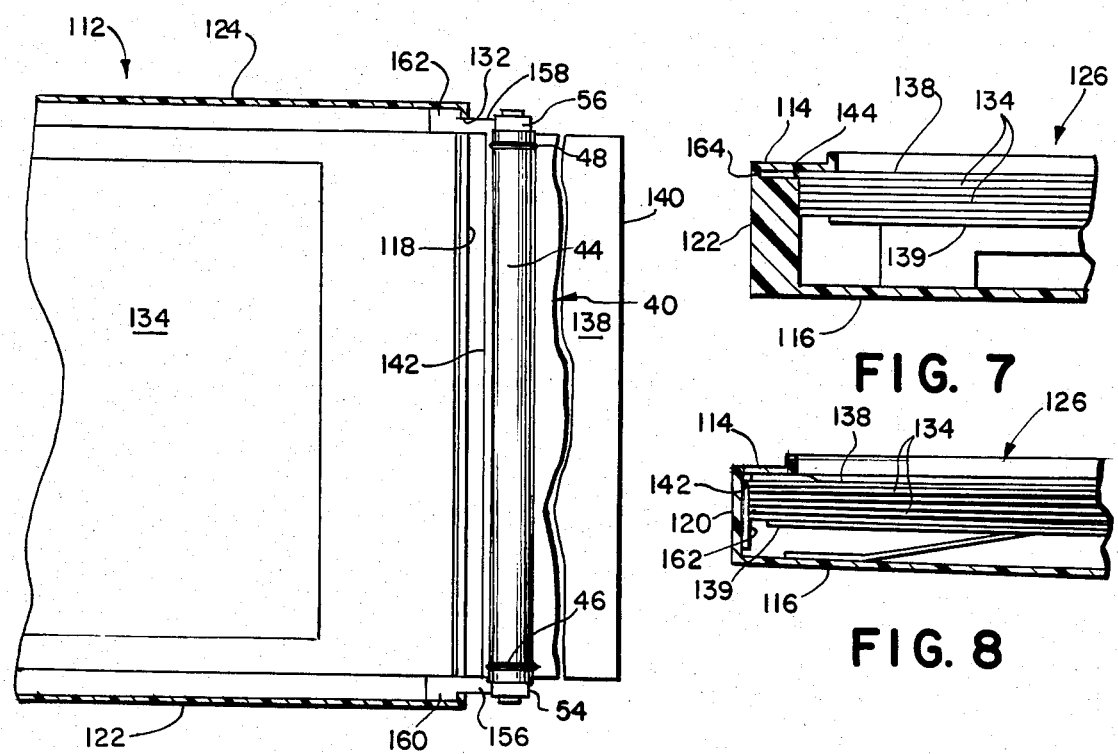
FIG. 5
FIG. 6
FIG. 7
FIG. 8

PHOTOGRAPHIC FILM ASSEMBLAGE WITH MEANS FOR ESTABLISHING A GAP BETWEEN A PAIR OF PRESSURE-APPLYING ASSEMBLIES

BACKGROUND OF THE INVENTION

1. Field of the Invention

The invention relates to a film assemblage which includes means for providing a processing liquid spreading assembly of a self-developing type camera with a gap of a predetermined value.

2. Description of the Prior Art

In photographic apparatus of the self-developing type, an exposed photosensitive element is processed by distributing a processing liquid in a thin layer between the photosensitive element and another element. The processing liquid may be provided initially in a rupturable pod or container coupled to one of the elements and is distributed between the elements by moving them in superposition together with the rupturable container through a convergent passage between a pair of juxtaposed pressure-applying members, e.g., rollers.

For optimum results, measured for example in terms of image quality and uniformity, as well as reliability and repeatability, the layer of processing liquid distributed between the elements of the film unit should be of a predetermined thickness. When the processing liquid is distributed by moving the elements through a convergent passage between a pair of pressure-applying members that are free to move apart from one another and are resiliently biased toward one another, the thickness or depth of the layer of processing liquid is dependent upon a number of factors, including the pressure exerted by the pressure-applying members, the viscosity of the processing liquid, the speed of movement of the film unit through the gap between the pressure-applying members, and the spacing between the pressure-applying members as the film unit enters the gap.

U.S. Pat. No. 3,732,099 discloses a camera of the self-developing type wherein the pressure of the pressure-applying members of a processing liquid spreading assembly on a film unit is varied in inverse relation to the ambient temperature (and thus to the viscosity of the processing liquid) to provide for distribution of the processing liquid in a layer of predetermined thickness. U.S. Pat. No. 3,604,329 discloses a similar type camera wherein the thickness of the layer of processing liquid spread between the elements of the film unit is controlled by maintaining the compressive force exerted on the film unit by the pressure-applying members substantially constant and varying the speed of movement of the film unit between the members to compensate for changes in the viscosity of the processing liquid. Still another example of the prior art relating to means for controlling the thickness of the layer of processing liquid spread between elements of the film unit is found in U.S. Pat. No. 3,882,518 wherein the spacing or gap between the adjacent surfaces of a pair of superposed rollers is controlled by a pair of adjustable screws. Also, see U.S. Pat. No. 4,104,669 wherein is described a camera having a bimetallic element which exerts a pressure on a film cassette so as to control the thickness of the layer of processing liquid.

While all of the above-described apparatus perform their intended functions well, there is still a need for a novel, simple, and inexpensive means for providing a spread of processing liquid which has a predetermined thickness.

SUMMARY OF THE INVENTION

The instant invention relates to apparatus for establishing a predetermined spacing (pregap) between the juxtaposed surfaces of a pair of liquid spreading members, preferably rollers, which rollers are adapted to subsequently spread a processing liquid between elements of a photographically exposed film unit and, more particularly, to a film assemblage having such means.

In a preferred embodiment of the invention the film assemblage includes a film cassette having an opening in one wall thereof through which a film unit may be exposed, and an egress through which the exposed film unit may be moved to the exteror of the film cassette. Located within the film cassette is a stack of film units of the self-developing or instant type, a dark slide for preventing premature exposure of an endmost film unit in the stack during loading of the film cassette into a camera, and suitable means, e.g., a spring-biased member, for resiliently urging the stack of film units towards the exposure opening in the film cassette. The exterior of the film cassette includes at least one protrusion, hereinafter referred to as a shim (even though it need not be tapered), which is adapted to be located between a pair of roller assemblies during loading of the film assemblage so as to provide a gap of a predetermined depth, as measured in a plane containing the axes of the rollers, between the rollers of the assemblies, such gap being directly related to the preferred thickness of a layer of processing liquid to be spread between elements of the film units in that particular film cassette. Removal of the film cassette from the camera automatically removes the shim(s) from between the roller assemblies thereby allowing the rollers to return to their original positions where the adjacent surfaces of the rollers may or may not be spaced from each other.

In an alternative embodiment of the invention the shims are detachably connected to the sides of the dark slide. As the dark slide is being advanced through a pair of juxtaposed spread rollers and toward the exterior of the camera, a portion of the dark slide having a thickness greater than that of the shims enters the bite of the rollers and moves at least one of them away from the other such that the shims may move to a position between adjacent bearing blocks of the rollers. At this time, the said portion of the dark slide moves out of engagement with the rollers thereby allowing the roller to move towards its original position thereby capturing the shims between the adjacent bearing blocks. The operator of the camera may then pull on the leading end of the dark slide thereby separating it from the shims.

An object of the above-described invention is to provide a simple and inexpensive means for automatically correlating the depth of the gap between a pair of liquid spreading members with the desired thickness of a layer of processing liquid to be spread between elements of a film unit in a film assemblage during loading of such assemblage into photographic apparatus such as a camera.

Another object of the invention is to provide a film assemblage with means for providing a pair of pressure-applying rollers with a gap of a predetermined depth during loading of the film assemblage.

Still another object of the invention is to provide a film cassette containing a plurality of film units of the self-developing type with means for providing a pair of liquid spreading rollers with a gap of a predetermined depth, which gap will control within desired limits the thickness of a layer of processing liquid to be subsequently spread between elements of the film units.

Still another object of the invention is to provide a film assemblage of the self-developing type with a dark slide having means thereon for establishing a gap of a predetermined depth between a pair of rollers as the dark slide is being moved between and in engagement with the rollers.

Other objects of the invention will in part be obvious and will in part appear hereinafter.

The invention accordingly comprises a film assemblage possessing the features, properties and the relation of components which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 1 is a perspective view, partially cut away, of a film assemblage of the self-developing or instant type which incorporates a preferred embodiment of the instant invention;

FIG. 2 is an enlarged side elevational view showing the relationship between a leading end of the film assemblage of FIG. 1 and a pair of pressure-applying assemblies;

FIG. 2a is an end view, on a reduced scale, of a portion of the pair of pressure-applying assemblies shown in FIG. 2, taken generally along the line 2a—2a of FIG. 2;

FIG. 5 is a perspective view, partially cut away, of an alternative embodiment of a film assemblage which incorporates the instant invention, a dark slide of the film assemblage being shown in exploded relation for reasons of clarity;

FIG. 6 is a plan view of a portion of the film assemblage of FIG. 5 showing the dark slide between a pair of rollers;

FIG. 7 is a cross-sectional view of a portion of the film assemblage taken generally along the line 7—7 in FIG. 5;

FIG. 8 is a view similar to FIG. 7 taken generally along the line 8—8 of FIG. 5.

DETAILED DESCRIPTION OF THE INVENTION

Figure 3:
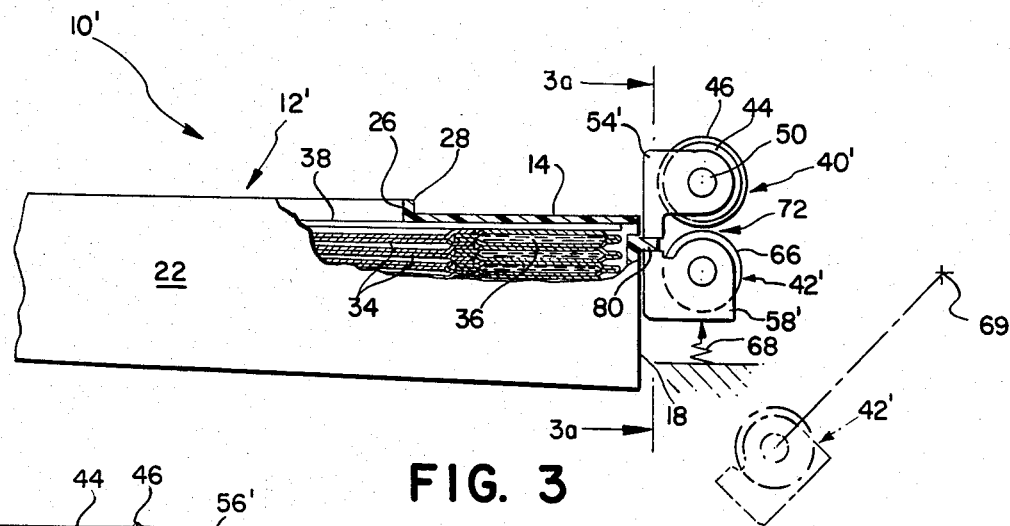
FIG. 3 is a view similar to that of FIG. 2 showing a modified leading end of a film assemblage and its relation to a pair of pressure-applying assemblies.
Figure 3A:
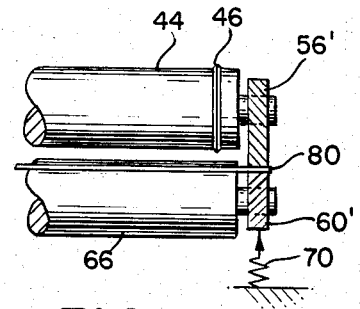
FIG. 3a is an end view, on a reduced scale, of a portion of the pair of pressure-applying assemblies shown in FIG. 3, taken generally along the line 3a—3a of FIG. 3.

Reference is now made to the drawings, and in particular to FIGS. 1 and 2 of the drawings, wherein is shown a film assemblage 10 which incorporates a preferred embodiment of the instant invention. The film assemblage 10 includes a film cassette 12 having forward and rear walls 14 and 16 which are integrally interconnected at their edges by a leading end wall 18, a trailing end wall 20 and a pair of transversely spaced side walls 22 and 24. The forward wall 14 includes an exposure aperture 26 defined by an upstanding rib 28 which extends around four sides of the exposure aperture 26, and an opening 30, which also extends part way down the trailing end wall 20, through which a member of a film advancing mechanism of a camera may extend so as to engage and move an element to the exterior of the film cassette 12 via an egress 32 located in the leading end wall 18. Located within the film cassette 12 is a plurality of film units 34 of the self-developing or instant type each of which is comprised of a plurality of elements including a photosensitive or image-recording element, and a rupturable container or pod 36 containing a supply of processing liquid. The pod 36 is adapted to be ruptured and its contents spread in a layer of a predetermined thickness between elements of the film unit 34 so as to initiate the formation of a visible image within the film unit 34. Also located within the film cassette 12 is a dark slide 38 which is formed from any suitable opaque material and is dimensioned so as to preclude the premature exposure of a film unit 34 to ambient light during loading of the film assemblage 10 into a camera. As seen in FIG. 1, the film units 34 are located in a stack with the dark slide 38 located between an endmost film unit 34 in the stack and the interior surface of the forward wall 14. The film units 34 are resiliently biased toward the exposure aperture 26 by a platen (not shown) which is located between the rear wall 16 and the other endmost film unit 34 in the stack.

The film assemblage 10 is adapted for use in a camera of the type which includes a pair of pressure-applying assemblies 40 and 42, shown schematically in FIGS. 2 and 2a. The pressure-applying assembly 40 includes a generally cylindrically shaped roller 44 having an annular collar 46 and 48, formed from a resilient material, at opposite ends thereof, and a pair of journals 50 and 52 which are rotatably supported within a fixed pair of bearing blocks 54 and 56, respectively. The pressure-applying assembly 42 includes a pair of bearing blocks 58 and 60 which rotatably support the journals 62 and 64 of a generally cylindrically shaped roller 66. The pressure-applying assembly 42 is supported by means (not shown) for pivotal movement about an axis 69 between a film assemblage loading position, as shown in broken lines in FIG. 2, and a position, as shown in solid lines in FIG. 2, wherein the pressure-applying assembly 42 is located in operative relation to the pressure-applying assembly 40 and to the film assemblage 10. The bearing blocks 58 and 60 are supported within the camera for movement toward and away from the pressure-applying assembly 40. A pair of springs 68 and 70 resiliently urge the bearing blocks 58 and 60 upwardly (as shown in FIG. 2a) into contact with a pair of stops (not shown) such that its roller 66 defines a pressure-generating gap 72 with the adjacent surface of the roller 44.

The instant invention includes means for automatically adjusting the depth of the gap 72 to a predetermined amount such that the rollers 44 and 66 will thereafter rupture the pod 36 of one of the film units 34 and spread its contents between elements of the film unit 34 in a layer of desired thickness. Specifically, these means include a pair of substantially identical shims 74 and 76 which extend outwardly from the side walls 22 and 24 and forwardly of the leading end wall 18 of the film cassette 12. The shims 74 and 76 have a thickness which is related to the desired thickness (depth) of the layer of processing liquid to be spread between elements of the particular film units 34 in that particular film assemblage. For example, if the film units 34 in this particular film assemblage came from a batch where the parameters, e.g., sensitometry of the film, that determine the optimum thickness of the layer of processing liquid to be spread between elements of those film units dictated that the spread should be of an increased thickness, vis-a-vis a given norm, then the thickness of the shims would be correlated therewith. For example, the thickness of the shims may be changed in increments of 0.0002 inches. If it were determined that the thickness of the layer should be thinner than the norm, then the thickness of the shims 74 and 76 would be adjusted in the opposite direction. Accordingly, it can be seen from FIG. 2 that when a film assemblage 10 has been loaded into a camera and the pressure-applying assembly 42 rotated about its axis 69 into the solid line position, its bearing blocks 58 and 60 engage the shims 74 and 76 thereby causing the bearing blocks 58 and 60 to be moved downwardly by an amount equal to the thickness of the shims 74 and 76, e.g., approximately 0.005 inches. The downward movement of the bearing blocks 58 and 60 is transferred to the roller 66 thereby increasing the gap 72 by an amount equal to the thickness of the shims 74 and 76.

After the dark slide 38 has been advanced through the rollers 44 and 66 to the exterior of the camera, and the uppermost film unit 34 in the film cassette 12 has been photographically exposed, it is advanced into the bite of the rollers 44 and 66, at least one of which is preferably being driven at this time. As the leading end of the film unit 34 approaches the gap between the rollers 44 and 66, the latter rupture the pod 36 and spread a mass of processing liquid between elements of the film unit 34 to initiate the formation of a visible image within the film unit. This mass of processing liquid is deposited between the elements in advance of the pressure-applying rollers 44 and 66. During such spreading it is essential that the processing liquid be confined within the area of the elements upon which it is acting, both to effect an even action therein and to prevent extrusion of the fluid onto adjacent surfaces of the rollers 44 and 66. The means of confining this liquid within the elements is the pair of annular collars 46 and 48 on the opposite ends of the roller 44. As the film unit 34 moves between and in engagement with the rollers 44 and 66, the resilient collars 46 and 48 engage the upper surface of the film unit in advance of the rollers 46 and 48 such that the elements, between which the processing liquid is being spread, are pressed together and slightly deformed into a crease extending longitudinally along the lateral margins of the elements from the point of contact of the rollers 44 and 66. The portions of the collars 46 and 48 contacting the film continue to move with the film into the gap between the rollers 44 and 66. When those portions of the collars 46 and 48 move into the gap, the pressure exerted therein causes these portions to deform (see FIG. 11) such that the critical gap dimension is not interfered with. After all of the film units 34 have been exposed and moved between the rollers 44 and 46 and then to the exterior of the camera, the film cassette 12 may be removed from the camera thereby allowing the rollers 44 and 66 to return to their original relative positions wherein the collars 46 and 48 are located closely adjacent to the roller 66.

Figure 4:
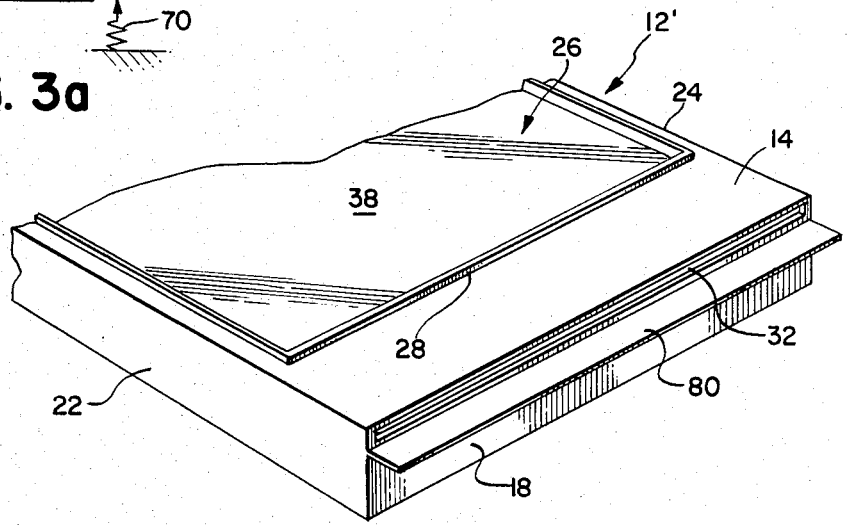
FIG. 4 is a perspective view of a portion of the film assemblage shown in FIG. 3.

Reference is now made to FIGS. 3 and 4 wherein is shown a film assemblage 10' which is a modification of the film assemblage 10. The film assemblage 10' is identical to that previously described with reference to FIGS. 1 and 2 except herein a film cassette 12' has a singular shim 80 which protrudes forwardly from the leading end wall 18 at a point just below the egress 32 and extends across substantially the entire width of the film cassette 12'.

The film assemblage 10' is loaded into a camera in the same manner as described previously with regard to the film assemblage 10. However, the pressure-applying assemblies 40 and 42 have been slightly modified. Specifically, FIG. 3 shows a pair of pressure-applying assemblies 40' and 42' which are substantially identical to the assemblies 40 and 42 except for the bearing blocks 54', 56', 58' and 60'. These bearing blocks have shim engaging surfaces which are to the left of a plane containing the journals of the rollers 44 and 66, as viewed in FIG. 3, and engage the shim 80 at a point below a horizontal plane which passes through the gap 72 between the rollers 44 and 66.

Reference is now made to FIGS. 5 and 6 of the drawings wherein is shown an alternative embodiment of a film assemblage 100. The film assemblage 100 includes a film cassette 112 which is generally similar to the film cassettes 12 and 12'. The film cassette 112 includes a forward wall 114, mostly cut away for reasons of clarity, and a rear wall 116. The walls 114 and 116 are interconnected at their edges by a leading end wall 118, a trailing end wall 120, and a pair of laterally spaced side walls 122 and 124. The forward wall 114 includes an exposure opening 126 defined by a rib 128 which extends around four sides of the exposure aperture 126, and opening 130, which also extends part way down the trailing end wall 120, through which a member of a film advancing mechanism of a camera may extend so as to engage and move an element, e.g., a film unit, to the exterior of the film cassette 112 via an egress 132 located in the leading end wall 118. Located within the film cassette 112 is a plurality of film units 134 of the self-developing or instant type each of which is comprised of a plurality of elements including a photosensitive or image-recording element, and a rupturable container or pod 136 containing a supply of processing liquid. The pod 136 is located on the leading end of the film unit and is adapted to be ruptured and its contents spread in a layer of a predetermined thickness between elements of a film unit 134 so as to initiate the formation of a visible image within the film unit 134. Also located within the film cassette 112 (shown in exploded relation in FIG. 5 for reasons of clarity) is a dark slide 138 which is formed from any suitable opaque material and is dimensioned so as to preclude the premature exposure of a film unit 134 to ambient light during loading of the film assemblage 110 into a camera. As seen in FIGS. 7 and 8, the film units 134 are located in a stack with the dark slide 138 located between an endmost film unit 134 in the stack and the interior surface of the forward wall 114. The film units 134 are resiliently biased toward the exposure aperture 126 by a platen 139 which is located between the rear wall 116 and the other endmost film unit 134 in the stack.

The dark slide 138 has length and width dimensions substantially equal to the corresponding dimensions of the film units 134, as is the case with the dark slide 38 previously described. The dark slide 138 includes a leading edge 140 which is initially located in alignment with the egress 132, a trailing edge 142, and a pair of laterally spaced sides 144 and 146. An L-shaped shim 148 constructed from a non-compressible, flexible material is integrally formed with the side edge 144 near the trailing edge 142, and is readily detachable therefrom by a weakened area 150. An identical shim 152 is detachably connected to the other side 146 by a weakened area 154. Each of the shims 148 and 152 includes a longitudinally extending portion 156 and 158, and a laterally extending portion 160 and 162, respectively. In order to accommodate the additional width caused by the shims 148 and 152, the side walls 122 and 124 are recessed at 164 (see FIG. 7) throughout their lengths. The width of the egress 132 is slightly larger than the combined width of the dark slide 138 and the width of the longitudinally extending portions 156 and 158 but less than the distance between the outwardly facing ends of the laterally extending portions 160 and 162. Accordingly, as shown in FIG. 6, when the dark slide 138 is being advanced between the rollers 44 and 66 of the pressure-applying assemblies 40 and 42, the laterally extending portions 160 and 162 engage the interior surfaces of the leading end wall 118 thereby preventing complete movement thereof from the film cassette 112 while allowing the longitudinally extending portions 156 and 158 to become lodged between the bearing blocks 54, 56, 58 and 60 of the assemblies 40 and 42. In order to facilitate the introduction of the portions 156 and 158 of the shims 148 and 152 between the aforementioned bearing blocks, the dark slide 138 is provided with an area 170 of gradual increasing thickness as measured from the leading to the trailing edge of the dark slide 138 which is terminated at an edge 172. At approximately the time that the portions 156 and 158 have been moved to a position between the bearing blocks, the enlarged portion 170 of the dark slide 138 moves out of engagement with the rollers 44 and 66 thereby allowing the spring-biased roller 66 to move back toward the roller 44 thereby capturing the portions 156 and 158 between the respective bearing blocks. At this moment in time, the drive to the rollers 44 and 66 is terminated and the operator of the camera may grasp the dark slide 138 by its protruding end and pull on it thereby separating it from the portions 156 and 158 of the shims 148 and 152 which remain between the bearing blocks. Thus, the rollers 44 and 66 are spaced from each other by a distance that will provide the optimum spread thickness of the layer of processing liquid between the elements of the film units 134. When the film cassette 112 is removed from the camera, the shims 148 and 152 are automatically removed from between the bearing blocks thereby allowing the rollers 44 and 66 to return to their original position.

Figure 11:
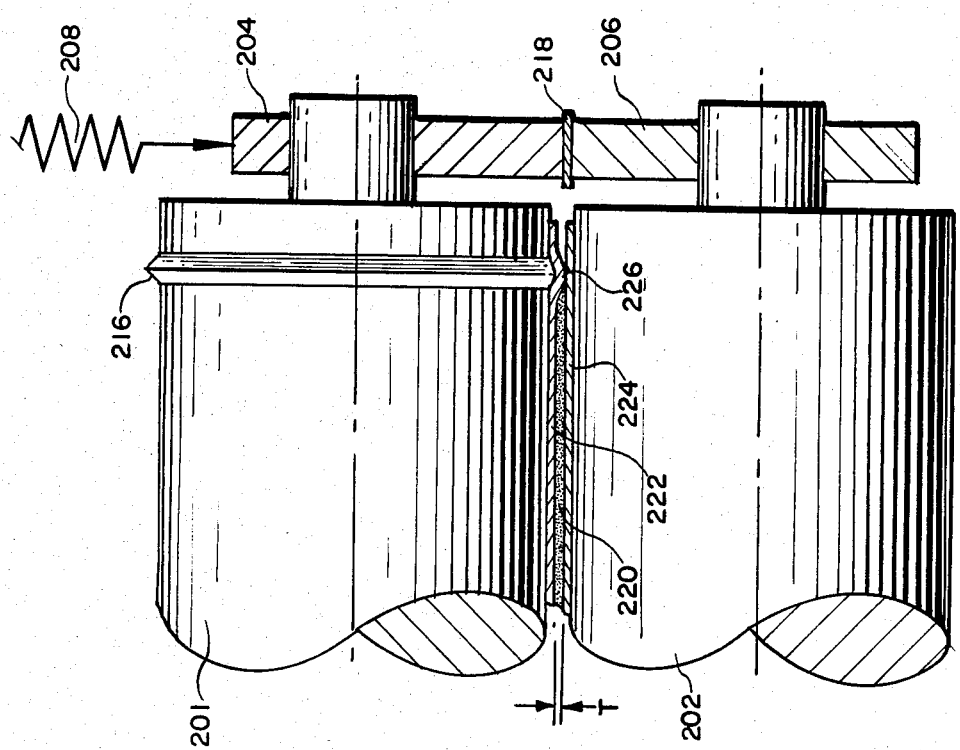
FIGS. 9-11 are enlarged end views of a pair of pressure-applying assemblies which schematically depict the operation of the invention.
Figure 10:
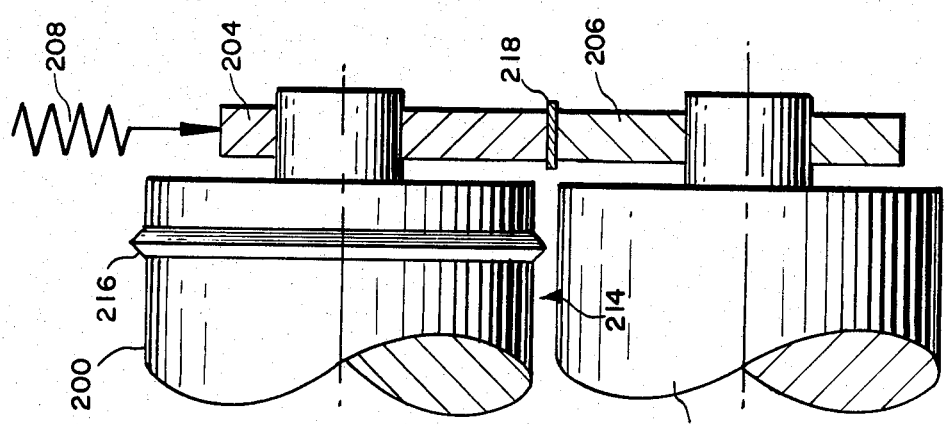
Figure 9:
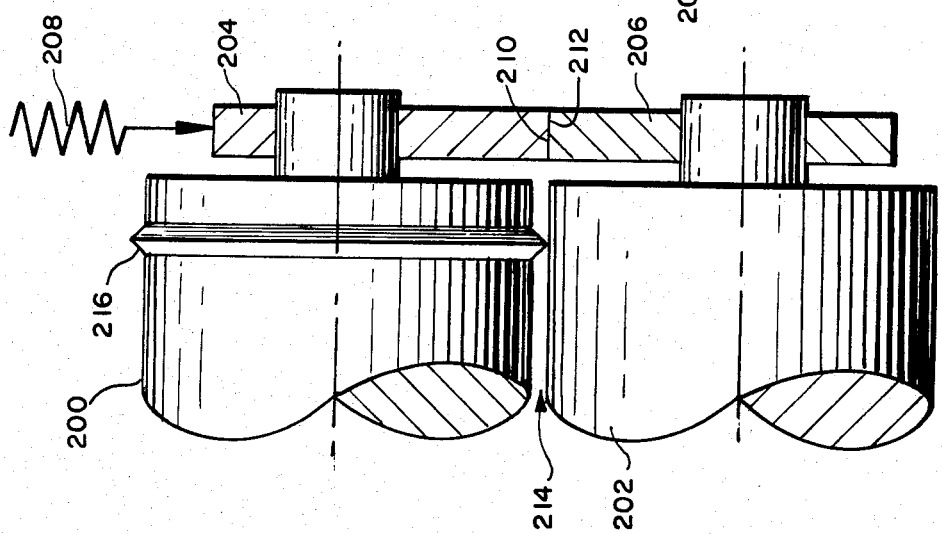

FIGS. 9-11 schematically demonstrate the principle of operation of the instant invention with respect to a pair of pressure-applying assemblies, each of which includes a roller 200 and 202 which is rotatably supported by a bearing block 204 and 206, respectively. FIG. 9 depicts the relative position of the rollers 200 and 202 before a film assemblage of the type described has been loaded into a camera containing such pressure-applying assemblies. It will be noted that the roller 200 is biased toward the roller 202 by a spring 208 such that the lowered surface 210 of the movable bearing block 204 is in engagement with the upper surface 212 of the fixed bearing block 206 thus establishing a gap 214 between the rollers 200 and 202 which is substantially equal to the height of a resilient annular collar 216 located adjacent each end of the roller 200. With the rollers 200 and 202 thus spaced, that portion of the collar 216 located in the gap 214 is not maintained in compression. Alternatively, the roller 202 could be provided with an annular groove to accommodate the collar. FIG. 10 depicts the relative position of the rollers 200 and 202 after a shim 218 has been located between the surfaces 210 and 212 of the bearing blocks 204 and 206, respectively. FIG. 11 depicts a processing liquid 220 being spread between elements 222 and 224 of an exposed film unit as it passes through the gap 214. Also depicted in FIG. 11 is a longitudinally extending crease 226 formed in the lateral edge of each side of the film unit by the resilient collar 216. Also, it will be noted that the force required to compress the collar 216 as it passes through the gap 214 is less than that required to further compress the spring 208 thereby maintaining the integrity of the gap 214, i.e., the predetermined spacing between the rollers 200 and 202 which in turn provide for a layer of processing liquid having a predetermined thickness T.

Since certain changes may be made in the above film assemblage without departing from the scope of the invention herein involved, it is intended that all matter contained in the above description or shown in the accompanying drawings shall be interpreted as illustrative and not in a limiting sense.

What is claimed is:

1. A film assemblage for use with a camera of the self-developing type having a pair of superposed pressure-applying assemblies at least one of which is movable relative to the other such that the adjacent spreading surfaces thereof define a gap therebetween having a predetermined minimum spacing for influencing the thickness of a layer of processing liquid to be subsequently spread between elements of an exposed film unit as it moves through the gap, said film assemblage comprising:

a film cassette having an exposure opening in one wall thereof through which a film unit is adapted to be exposed and an egress through which an exposed film unit is adapted to be moved;

a plurality of film units located within said film cassette, each said film unit comprising a container of processing liquid adjacent a leading end thereof, and a plurality of elements including a photosensitive element, said film units being arranged in a stack with said photosensitive element of an endmost film unit being located adjacent said exposure opening;

a dark slide positioned within said film cassette between said endmost film unit and said exposure opening for protecting said endmost film unit from premature exposure to ambient light during loading of said film cassette into a camera, said dark slide being adapted to be moved from said film cassette via said egress and completely through a pair of superposed pressure-applying assemblies; and spacing means engageble with at least one of the pressure-applying assemblies and spaced from its liquid spreading surface for establishing a predetermined minimum spacing between adjacent liquid spreading surfaces of each assembly, the value of the predetermined minimum spacing being related to the desired thickness of a layer of processing liquid to be spread between elements of said film units as they are moved in engagement with and between the liquid spreading surfaces.

2. A film assemblage as defined in claim 1 wherein said spacing means comprises a shim which extends from a wall of said film cassette and is adapted to be positioned between the pressure-applying assemblies during loading of said film cassette into a camera.

3. A film assemblage as defined in claim 1 wherein said spacing means comprises a pair of shims which extends from said dark slide, said shims being adapted to be positioned between the pressure-applying assemblies during movement of said dark slide between each assembly.

4. A film assemblage as defined in claim 3 wherein said shims are made from a flexible material and are adapted to be partially located in a plane parallel to a plane containing the trailing edges of said stack of film units when said dark slide is located within said film cassette.

5. A film assemblage for use with a camera of the self-developing type having a pair of superposed roller assemblies, each of which includes a pair of bearing blocks for rotatably supporting the opposite ends of a roller, at least one of the roller assemblies being movable relative to the other roller assembly to a position wherein the adjacent surfaces of the rollers define a gap therebetween having a predetermined spacing for influencing the thickness of a layer of processing liquid to be subsequently spread between elements of an exposed film unit as it moves through the gap between the rollers, said film assemblage including:

a film cassette having an exposure opening in one wall thereof through which a film unit is adapted to be exposed, and an egress through which a film unit is adapted to be moved;

a plurality of film units located within said film cassette, each said film unit comprising a container of processing liquid and a plurality of elements including a photosensitive layer, said film units being arranged in a stack with said photosensitive element of an endmost film unit being located adjacent said exposure opening;

means for preventing premature exposure of said endmost film unit during loading of said film cassette into a camera; and spacing means extending forwardly from a wall of said film cassette, said spacing means being positionable between the bearing blocks of said roller assemblies during loading of said film cassette into the camera for establishing a predetermined spacing between the opposing surfaces of the rollers, said predetermined spacing being directly related to a desired thickness of a layer of processing liquid to be spread between elements of said film units as they are moved in engagement with and between the rollers.

6. A film assemblage for use with a camera of the self-developing type having a pair of superposed roller assemblies, each of which includes a pair of bearing blocks for rotatably supporting the opposite ends of a roller, at least one of the roller assemblies being movable relative to the other roller assembly to a position wherein the adjacent surfaces of the rollers define a gap therebetween having a predetermined spacing for influencing the thickness of a layer of processing liquid to be subsequently spread between elements of an exposed film unit as it moves through the gap between the rollers, said film assemblage including:

a film cassette having an exposure opening in one wall thereof through which a film unit is adapted to be exposed, and an egress through which a film unit is adapted to be moved;

a plurality of film units located within said film cassette, each said film unit comprising a container of processing liquid and a plurality of elements including a photosensitive layer, said film units being arranged in a stack with said photosensitive element of an endmost film unit being located adjacent said exposure opening;

a dark slide for preventing premature exposure of said endmost film unit during loading of said film cassette into a camera; and spacing means extending from opposite sides of said dark slide and being laterally spaced from each other by a distance substantially equal to the spacing between the bearing blocks of each roller assembly, said spacing means being adapted to be positioned between the bearing blocks of each roller assembly as said dark slide is being advanced from said film cassette via said egress and moved between the rollers thereby establishing a predetermined spacing between the rollers, said predetermined spacing being directly related to the desired thickness of a layer of processing liquid to be spread between elements of said film units as they are moved in engagement with and between the rollers.

7. A film assemblage as defined in claim 6 further including means for detachably connecting said spacing means to said dark slide whereby an operator of the camera may grasp a leading end of said dark slide while said spacing means is between the bearing blocks and pull on it thereby separating said dark slide from said spacing means.

8. A film assemblage for use with a camera of self-developing type having a pair of superposed pressure-applying assemblies, at least one of which is movable relative to the other such that the adjacent liquid spreading surfaces thereof define a gap therebetween having a predetermined spacing for influencing the thickness of a layer of processing liquid to be subsequently spread between elements of an exposed film unit as it moves through the gap, said film assemblage comprising:

a film cassette having a forward wall having therein an exposure opening through which a film unit is adapted to be exposed, a leading end wall having an egress through which an exposed film unit is adapted to be moved, and a pair of laterally spaced side walls having forward ends interconnected by said leading end wall;

a plurality of film units located within said film cassette, each said film unit comprising a container of processing liquid adjacent a leading end thereof, and a plurality of elements including a photosensitive element, said film units being arranged in a stack with said photosensitive element of an endmost film unit being located adjacent said exposure opening;

a dark slide positioned within said film cassette between said endmost film unit and said exposure opening for protecting said endmost film unit from premature exposure to ambient light during loading of said film cassette into a camera, said dark slide being adapted to be moved at least partially from said film cassette via said egress and between a pair of superposed pressure-applying assemblies; and spacing means comprising a shim extending from one of said side walls to a position forwardly of said leading end wall and positionable between the pressure-applying assemblies during loading of said film cassette into a camera for establishing a predetermined spacing between adjacent liquid spreading surfaces of each assembly, the value of the predetermined spacing being related to the desired thickness of a layer of processing liquid to be spread between elements of said film units as they are moved in engagement with and between the liquid spreading surfaces.

9. A film assemblage as defined in claim 8 wherein said spacing means comprises a second shim which extends from the other of said side walls to a position forwardly of said leading end wall.

10. A film assemblage for use with a camera of the self-developing type having a pair of superposed pressure-applying assemblies, at least one of which is movable relative to the other such that the adjacent liquid spreading surfaces thereof define a gap therebetween having a predetermined spacing for influencing the thickness of a layer of processing liquid to be subsequently spread between elements of an exposed film unit as it moves through the gap, said film assemblage comprising:

a film cassette having an exposure opening in one wall thereof through which a film unit is adpated to be exposed, a leading end wall, and an egress in said leading end wall through which an exposed film unit is adapted to be moved;

a plurality of film units located within said film cassette, each said film unit comprising a container of processing liquid adjacent a leading end thereof, and a plurality of elements including a photosensitive element, said film units being arranged in a stack with said photosensitive element of an endmost film unit being located adjacent said exposure opening;

a dark slide positioned within said film cassette between said endmost film unit and said exposure opening for protecting said endmost film unit form premature exposure to ambient light during loading of said film cassette into a camera, said dark slide being adapted to be moved at least partially from said film cassette via said egress and between a pair of superposed pressure-applying assemblies; and spacing means comprising a shim which extends integrally from said leading end wall and is adapted to be positionable between the pressure-applying assemblies during loading of said film cassette into a camera for establishing a predetermined spacing between adjacent liquid spreading surfaces of each assembly, the value of the predetermined spacing being related to the desired thickness of a layer of processing liquid to be spread between elements of said film units as they are moved in engagement with and between the liquid spreading surfaces.

11. A film assemblage for use with a camera of the self-developing type having a pair of superposed pressure-applying assemblies, at least one of which is movable relative to the other such that the adjacent liquid spreading surfaces thereof define a gap therebetween having a predetermined spacing for influencing the thickness of a layer of processing liquid to be subsequently spread between elements of an exposed film unit as it moves through the gap, said film assemblage comprising:

a film cassette having a forward wall having therein an exposure opening through which a film unit is adapted to be exposed, a leading end wall having an egress through which an exposed film unit is adapted to be moved, and a pair of laterally spaced side walls having forward ends interconnected by said leading end wall;

a plurality of film units located within said film cassette, each said film unit comprising a container of processing liquid adjacent a leading end thereof, and a plurality of elements including a photosensitive element, said film units being arranged in a stack with said photosensitive element of an endmost film unit being located adjacent said exposure opening;

a dark slide positioned within said film cassette between said endmost film unit and said exposure opening for protecting said endmost film unit from premature exposure to ambient light during loading of said film cassette into a camera, said dark slide being adapted to be moved at least partially from said film cassette via said egress and between a pair of superposed pressure-applying assemblies; and spacing means comprising a shim extending forwardly from said leading end wall and located between said egress and a bottom wall of said film cassette, said shim being positionable between the pressure-applying assemblies during loading of the film cassette into a camera for establishing a predetermined spacing between adjacent liquid spreading surfaces of each assembly, the value of the predetermined spacing being related to the desired thickness of a layer of processing liquid to be spread between elements of said film units as they are moved in engagement with and between the liquid spreading surfaces.

12. A film assemblage for use with a camera of the self-developing type having a pair of superposed pressure-applying assemblies, at least one of which is movable relative to the other such that the adjacent liquid spreading surfaces thereof define a gap therebetween having a predetermined spacing for influencing the thickness of a layer of processing liquid to be subsequently spread between elements of an exposed film unit as it moves through the gap, said film assemblage comprising:

a film cassette having an exposure opening in one wall thereof through which a film unit is adapted to be exposed and an egress through which an exposed film unit is adapted to be moved;

a plurality of film units located within said film cassette, each said film unit comprising a container of processing liquid adjacent a leading end thereof, and a plurality of elements including a photosensitive element, said film units being arranged in a stack with said photosensitive element of an endmost film unit being located adjacent said exposure opening;

a dark slide positioned within said film cassette between said endmost film unit and said exposure opening for protecting said endmost film unit from premature exposure to ambient light during loading of said film cassette into a camera, said dark slide being adapted to be moved at least partially from said film cassette via said egress and between a pair of superposed pressure-applying assemblies; and spacing means comprising a shim extending integrally from a wall of said film cassette and positionable between the pressure-applying assemblies during loading of said film cassette into a camera for establishing a predetermined spacing between adjacent liquid spreading surfaces of each assembly, the value of the predetermined spacing being related to the desired thickness of a layer of processing liquid to be spread between elements of said film units as they are moved in engagement with and between the liquid spreading surfaces, and whereby removal of said film cassette from a camera automatically removes said shim from engagement with the pressure-applying assemblies.

13. A film assemblage for use with a camera of the self-developing type having a pair of superposed pressure-applying assemblies, at least one of which is movable relative to the other such that the adjacent liquid spreading surfaces thereof define a gap therebetween having a predetermined spacing for influencing in the thickness of a layer of processing liquid to be subsequently spread between elements of an exposed film unit as it moves through the gap, said film assemblage comprising:

a film cassette having an exposure opening in one wall through which a film unit is adapted to be exposed and an egress through which an exposed film unit is adapted to be moved;

a plurality of film units located within said film cassette, each said film unit comprising a container of processing liquid adjacent a leading end thereof, and a plurality of elements including a photosensitive element, said film units being arranged in a stack with said photosensitive element of an endmost film unit being located adjacent said exposure opening;

a dark slide positioned within said film cassette between said endmost film unit and said exposure opening for protecting said endmost film unit from premature exposure to ambient light during loading of said film cassette into a camera, said dark slide being adapted to be moved at least partially from said film cassette via said egress and between a pair of superposed pressure-applying assemblies;

spacing means comprising a pair of shims which extend from said dark slide said shims being adapted to be positioned between the pressure-applying assemblies during movement of said dark slide between each assembly for establishing a predetermined spacing between liquid spreading surfaces of each assembly, the value of the predetermined spacing being related to the desired thickness of a layer of processing liquid to be spread between elements of said film units as they are moved in engagement with and between the liquid spreading surfaces; and means for detachably connecting said shims to said dark slide.

14. A film assemblage as defined in claim 13 wherein said dark slide includes an area of increased thickness for momentarily spacing the pressure-applying assemblies apart by an amount greater than the thickness of said shims so as to facilitate the movement of said shims into their operative positions between the assemblies.

15. A film assemblage as defined in claim 14 wherein each of said shims includes an outwardly extending portion for preventing the dark slide from being completely removed from said film cassette.

* * * * *